United States Patent [19]
Altamura

[11] Patent Number: 6,122,985
[45] Date of Patent: Sep. 26, 2000

[54] TORQUE-DIVIDING TRANSMISSION, PARTICULARLY FOR AIRCRAFT

[75] Inventor: Paolo Altamura, Monopoli, Italy

[73] Assignee: Elasis Sistema Ricerca Fiat Nel Mezzogiorno Societa Consortile per Azioni, Pomigliano d'Arco, Italy

[21] Appl. No.: 09/073,126

[22] Filed: May 5, 1998

[30] Foreign Application Priority Data

May 6, 1997 [IT] Italy .................................. TO97A0386

[51] Int. Cl.$^7$ ........................... F16H 37/06; F16H 57/12; F16H 55/14
[52] U.S. Cl. ................................ 74/411; 74/392; 74/395; 74/410
[58] Field of Search ............................... 74/395, 410, 392, 74/411

[56] References Cited

U.S. PATENT DOCUMENTS

| | | | |
|---|---|---|---|
| 2,899,822 | 8/1959 | Matthews | 74/410 X |
| 2,995,046 | 8/1961 | Mansachs | 74/410 |
| 3,772,934 | 11/1973 | Warren | 74/410 |
| 4,312,244 | 1/1982 | Barnes et al. | 74/410 |
| 4,541,296 | 9/1985 | Oyafuso | 74/425 |
| 5,113,713 | 5/1992 | Isabelle et al. | 74/410 |
| 5,307,704 | 5/1994 | Muller et al. | 74/411 |

FOREIGN PATENT DOCUMENTS 2126686  3/1984  United Kingdom .

*Primary Examiner*—Allan D. Herrmann
*Attorney, Agent, or Firm*—Ladas & Parry

[57] ABSTRACT

A torque-dividing transmission, particularly for aircraft, having a single input pinion and a single output gear, both rotating about respective fixed axes; at least two gear assemblies, both interposed between the pinion and the output gear, and each for transferring a respective portion of the torque from the pinion to the output gear; and a torque-dividing device for dividing the input torque equally between the two gear assemblies; the torque-dividing device having, for each gear assembly, a number of elongated elements elastically bendable in use.

13 Claims, 3 Drawing Sheets

TORQUE-DIVIDING TRANSMISSION, PARTICULARLY FOR AIRCRAFT

BACKGROUND OF THE INVENTION

The present invention relates to a torque-dividing transmission, particularly for aircraft.

As is known, a torque-dividing transmission is interposed between the engine assembly and propulsive member of an aircraft, and normally comprises a single input pinion fitted to the output shaft of the engine assembly, a single output gear fitted to the shaft of the propulsive member, and two or more gear assemblies or branches for transmitting the input torque between the pinion and the output gear. The gear assemblies are arranged parallel to one another so as each to transfer, in use, to the shaft of the propulsive member a respective portion of the torque transmitted by the input shaft, and define, together with the pinion and the output gear, two or more respective speed reduction stages.

In known transmissions of the above type, on account of errors in both the form and position of the various parts of the transmission, the torque from the input pinion normally follows preferential routes, as opposed to being divided equally between the various branches of the transmission, so that it is impossible to determine the actual stress of each of the various gear assemblies or branches.

To overcome the above drawback, a torsion shaft is interposed between the reduction stages of each branch to compensate, by twisting, the above errors so that the input torque is divided acceptably between the various branches of the transmission.

Using torsion shafts, however, results in a considerable increase in length on account of the normally long length of the torsion shafts themselves. Moreover, as the gears of the torsion shafts must necessarily be supported independently, each branch, i.e. each torsion shaft, must be provided with at least four bearings, which inevitably increases the weight and size and impairs the reliability of the transmission.

Alternatively, the aforementioned drawbacks are eliminated using a floating self-centering input pinion for dividing the torque between the various branches. A floating pinion, however, allows for a maximum of three, as opposed to any number of, gear assemblies or branches, and numerous problems are encountered in controlling the position of the pinion, particularly in the event of a malfunction in one of the branches.

SUMMARY OF THE INVENTION

It is an object of the present invention to provide a straightforward, low-cost torque-dividing transmission designed to overcome the aforementioned drawbacks.

According to the present invention, there is provided a torque-dividing transmission, particularly for aircraft, comprising a single input pinion and a single output gear, both rotating about respective fixed axes; at least two gear assemblies, both interposed between the pinion and the output gear, and each for transferring a respective portion of the torque from the pinion to the output gear; and torque-dividing means for dividing the input torque equally between said two gear assemblies; characterized in that said torque-dividing means comprise, for each said assembly, a number of elongated elements elastically bendable in use.

Preferably, in the transmission as defined above, each of said assemblies has a main axis of rotation, and each of the elongated elements has a flexural rigidity, in a circumferential direction with respect to said main axis, which is less than the flexural rigidity in a direction parallel to the main axis.

Moreover, each of said gear assemblies preferably comprises at least a first gear coaxial with the main axis and having a number of spokes; and each spoke defines a respective said elastically bendable element.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
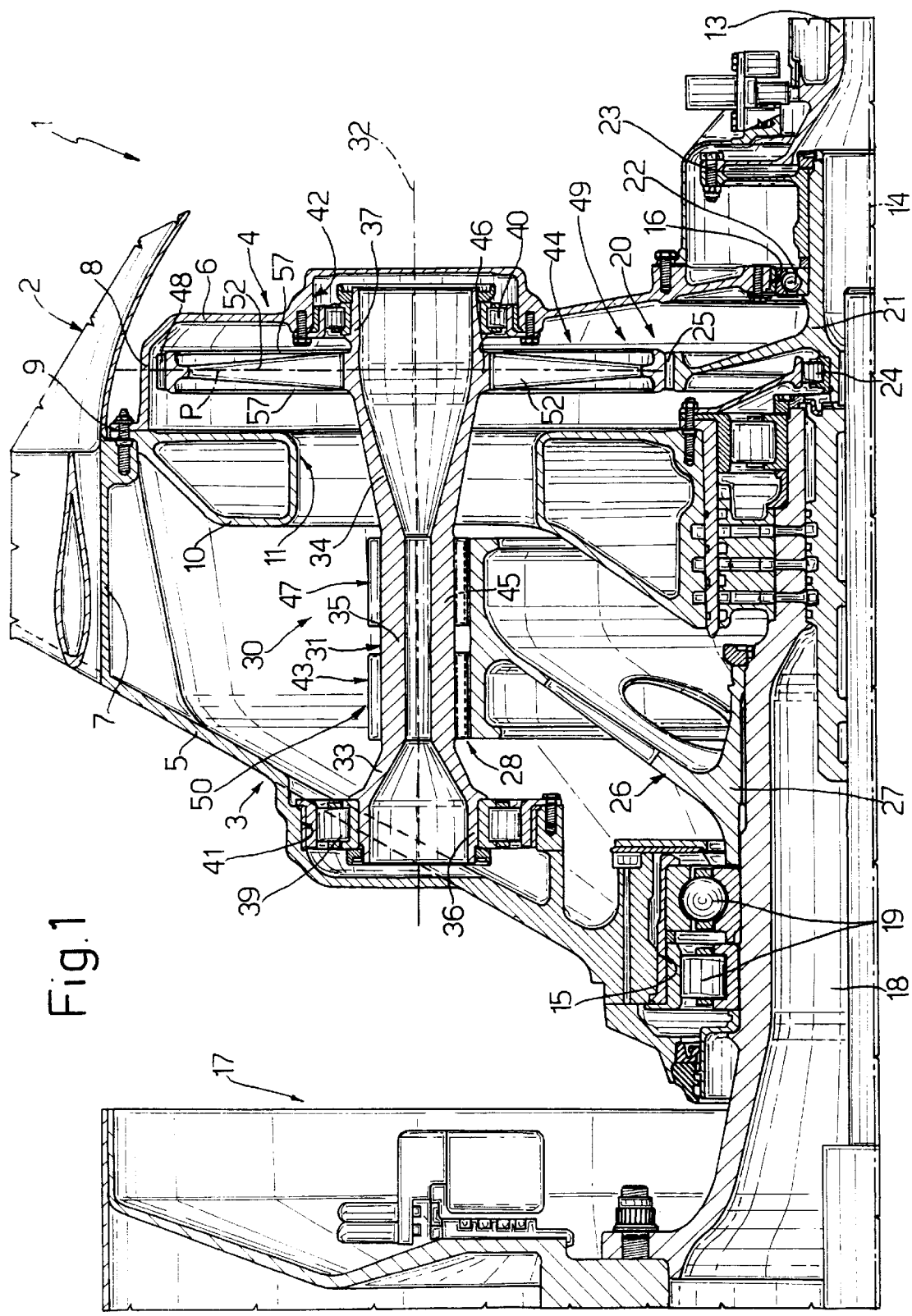
FIG. 1 shows a partial section of a preferred embodiment of the transmission according to the present invention and located between an engine assembly and propulsive member of an aircraft.

Numeral 1 in FIG. 1 indicates as a whole a power unit, particularly for a propeller aircraft (not shown). Unit 1 comprises a fixed supporting structure 2, in turn comprising a first and a second hollow body 3 and 4 having respective concavities facing each other, and in turn comprising respective end walls 5 and 6 facing each other, and respective lateral walls 7 and 8 connected to each other by means of a number of screws 9.

Structure 2 also comprises an intermediate hollow annular body 10 extending between bodies 3 and 4, positioned facing walls 5 and 6, and having a peripheral portion connected to bodies 3 and 4 by means of screws 9, and a number of through openings 11, only one of which is shown in FIG. 1.

Again with reference to FIG. 1, unit 1 also comprises a known motor (not shown) located outside wall 6 and having a respective output shaft 13 rotating about a respective fixed axis 14 extending through two openings 15 and 16 formed respectively in walls 5 and 6. Unit 1 also comprises a known propulsive member 17, e.g. a normal or a ducted propeller, powered by a torsion shaft 18, which extends inside structure 2 through opening 15, and is connected to structure 2 coaxially with axis 14 and in line with shaft 13 by means of a pair of bearings 19 housed in opening 15.

Finally, unit 1 comprises a torque-dividing gear transmission 20 housed inside structure 2 and angularly connecting shafts 13 and 18.

Transmission 20 comprises a single input pinion 21 extending coaxially with axis 14 through opening 16, and which in turn comprises an intermediate portion connected to wall 6 by means of a bearing 22; a first end portion projecting outwards of wall 6 and connected integrally to shaft 13 by means of a number of screws 23 (only one shown in FIG. 1); a second end portion connected to intermediate body 10 by a respective bearing 24; and straight or helical cylindrical outer teeth 25.

Transmission 20 also comprises a single output gear 26, which in turn comprises a respective hub 27 fitted in known manner to an intermediate portion of shaft 18; and straight or helical cylindrical outer teeth 28.

Finally, transmission 20 comprises a number of branches or gear assemblies 30 (only one shown in FIGS. 1 and 2) located parallel to one another between pinion 21 and output gear 26, and each for transferring, in use, to output gear 26 a respective portion of the torque transmitted by pinion 21.

As shown particularly in FIG. 1, each gear assembly 30 is formed in one piece, and comprises a hollow supporting shaft 31 loosely engaging a respective opening 11 and having a respective axis 32 parallel to axis 14. More specifically, shaft 31 comprises two conical intermediate portions 33 and 34 tapering towards each other and separated by a cylindrical portion 35; and two cylindrical end portions 36 and 37 extending from respective conical intermediate portions 33 and 34.

Each gear assembly 30 is connected to structure 2 to rotate about axis 32 of shaft 31 by means of only two bearings 39 and 40 connected to respective end portions 36 and 37 of shaft 31 and housed in respective seats 41 and 42 formed respectively in wall 5 of body 3 and wall 6 of body 4 (FIG. 1).

In the example described, each assembly 30 also comprises two gears 43 and 44, which have respective hubs 45 and 46 respectively integral with cylindrical portion 35 and a portion of end portion 37 adjacent to conical portion 34, and respective straight or helical outer teeth 47 and 48 meshing respectively with teeth 28 and 25 to define two speed reduction stages 50 and 49.

Gear 44 is a spoked gear with a much larger outside diameter than gear 43—in the example described, about five times the outside diameter of gear 43—and comprising a number of elongated radial spokes 52, which, when undeformed, are all coplanar with one another in a plane perpendicular to axis 32 and indicated by line P in FIG. 1. Each spoke 52 is so formed as to be elastically bendable in plane P and substantially rigid in a direction perpendicular to plane P. That is, each spoke 52 is so formed that the flexural rigidity in a circumferential direction with respect to axis 32 is much smaller than the flexural rigidity in a direction parallel to axis 32. For which purpose, in the example described, each spoke 52 has a rectangular cross section, the long sides of which extend parallel to axis 32, and which decreases from hub 46 towards teeth 48.

Figure 2:
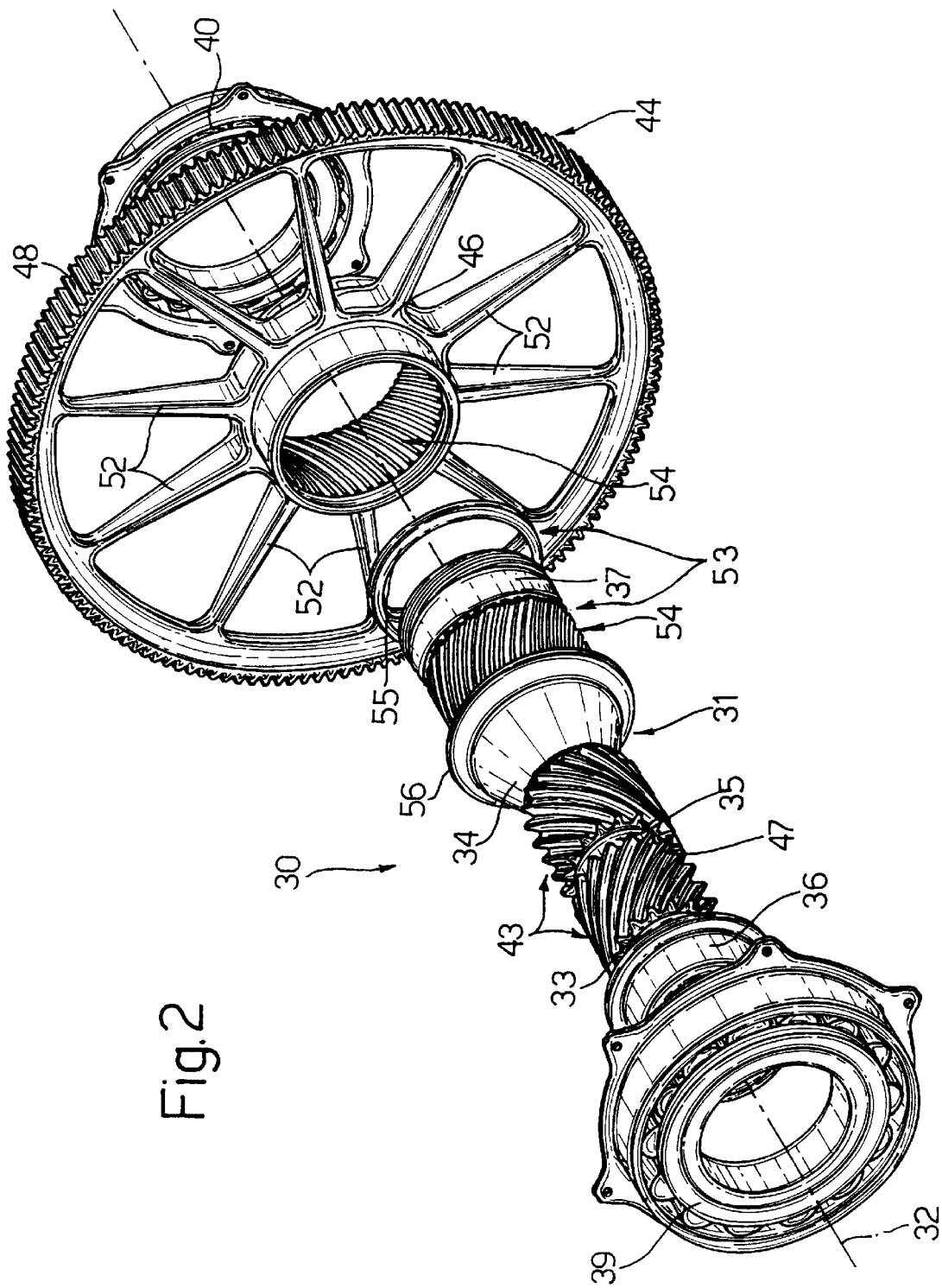
FIG. 2 shows an exploded view in perspective of a variation of a detail in FIG. 1.
Figure 3:
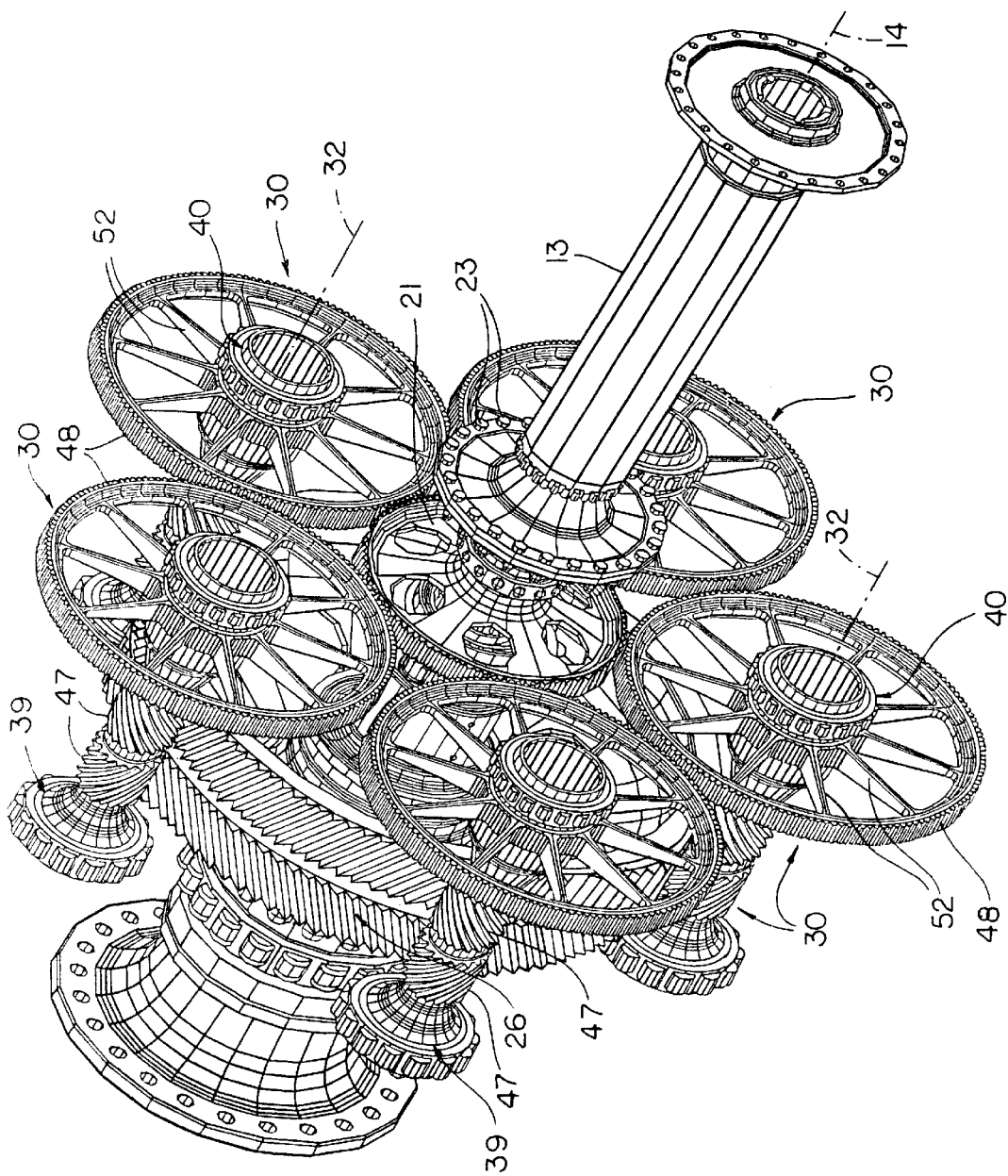
FIG. 3 is a diagrammatic perspective view showing a number of gear assemblies of the transmission.

In the FIG. 2 variation, as opposed to being integral with end portion 37 of shaft 31, hub 46 of spoked gear 44 is connected releasably to end portion 37 by an adjustable connecting device 53, which, when assembling assembly 30, provides for angularly adjusting, about axis 32, teeth 48 of gear 44 with respect to teeth 47 of gear 43.

In the example described, device 53 comprises a known helical splined coupling 54, and an annular adjusting element 55. Adjusting element 55 surrounds portion 37 of shaft 31, extends between hub 46 of gear 44 and an axial shoulder 56 integral with portion 37, and is selectable from a number of annular elements (not shown) of different thicknesses (measured axially).

Finally, as shown in FIG. 1, each assembly 30 comprises two annular guards 57, which are located on either side of spoked gear 44 to fully enclose spokes 52, are connected integrally to gear 44, and are so sized as to permit angular displacement of teeth 48 with respect to hub 46, and to prevent energy loss by ventilation.

In actual use, when the engine (not shown) is started, the torque transmitted by pinion 21 is divided equally and in predetermined manner between the various branches or gear assemblies 30 defining transmission 20, regardless of any errors due to shape or position tolerances of the various members defining transmission 20.

Such errors in fact are automatically compensated in each branch 30 by elastic circumferential bending of spokes 52 permitting small angular displacements, of teeth 48 of gear 44 with respect to hub 46. As the rotation angles of teeth 48 with respect to hubs 46 are fairly small, spokes 52 are obviously only subjected to bending stress, and, given the particular shape of the spokes, are practically only deformed circumferentially with respect to the relative shafts, i.e. in said plane P. Moreover, given the fairly small rotation angles of teeth 48 with respect to hubs 46, the relationship between the transmitted torque and the rotation angle of teeth 48 with respect to each hub 46 is obviously a linear relationship.

Unlike known solutions, using elastically bendable radial elements obviously poses no limit to the number of torque-dividing branches used in the transmission, and provides for fitting all the gears of each branch directly to a common supporting shaft, which is connected to the structure by only two bearings and is much shorter than conventional commonly used torsion shafts.

As compared with known transmissions, transmission 20 as described therefore comprises fewer components—in particular, half the supports normally provided in each branch of conventional torque-dividing transmissions featuring torsion shafts—thus greatly reducing overall weight and length.

As compared with known transmissions, using a small number of bearings 39, 40 and a single supporting shaft 31 for all the gears of each branch 30 provides for further reducing positioning errors, and for obtaining a far more reliable, efficient transmission that can be controlled even in the event of a malfunction in one of the branches.

Clearly, changes may be made to transmission 20 as described and illustrated herein without, however, departing from the scope of the present invention.

In particular, gears 43 and 44 of each branch or assembly 30 may differ in number and may comprise teeth 47, 48 other than those described by way of example. For example, the gears defining one or both reduction stages 49 and 50 may be so-called face gears, and may be so arranged as to form nonparallel torque-dividing transmissions, which are easy to implement and extremely reliable, particularly on account, as stated, of the various spoked gears 44 being extremely rigid axially, while at the same time permitting small angular displacements of teeth 48 with respect to hubs 46.

Moreover, shaft 31 may be shaped differently from the one described by way of example, and may be supported by a pair of bearings not necessarily the same as bearings 39 and 40 and located differently with respect to each other from those described.

Input and output shafts 13 and 18 may have respective axes parallel to but spaced transversely with respect to each other.

Finally, device 54 connecting each spoked gear 44 to respective shaft 31 may be replaced by a different connecting device, e.g. a double-splined vernier device.

What is claimed is:

1. A torque-dividing transmission (20), for aircraft, comprising a single input pinion (21) and a single output gear (26), both rotatable about respective fixed axes (14); a plurality of gear assemblies (30) interposed between the input pinion (21) and the output gear (26) for transferring a respective portion of input torque from the input pinion (21) to the output gear (26); and torque-dividing means (44) for dividing the input torque equally between said plurality of gear assemblies (30); said torque-dividing means (44) comprising for each said gear assembly (30), a first gear (44) having an axis of rotation (32) parallel to a main axis of rotation (14) of said input pinion, the first gears of the plurality of gear assemblies being arranged around said main axis (14) and connected in driving relation to said output gear, said first gear including a number of radial spokes (52) each comprising an elastically bendable element having a flexural rigidity in a circumferential direction with respect to said axis of rotation (32), which is less than the flexural rigidity in a direction parallel to said axis of rotation (32).

2. A transmission as claimed in claim 1, wherein said main axis (32) and said fixed axes (14) are parallel.

3. A transmission as claimed in claim 1, in use, said radial spokes (52) flex while remaining substantially in a plane (P) perpendicular to said axis of rotation (32) and wherein the radial spokes (52) of the first gears are coplanar with one another when the radial spokes (52) are undeformed.

4. A transmission as claimed in claim 1, wherein each of said gear assemblies (30) also comprises at least a second gear (43); said first gear (44) having an outside diameter greater than the outside diameter of said second gear (43).

5. A transmission as claimed in claim 4, wherein both said gears (43)(44) rotate about said axis of rotation (32), and are connected to a fixed structure (2) by means of only two bearings (39)(40).

6. A transmission as claimed in claim 5, wherein each said assembly (30) comprises a single supporting shaft (31) parallel to said main axis (32) and connected to said structure (2) by means of said two bearings (39)(40); said two gears (43)(44) being carried by said shaft (31).

7. A transmission as claimed in claim 6, wherein said two gears (43)(44) and said supporting shaft (31) are formed in one piece.

8. A transmission as claimed in claim 6, comprising adjustable connecting means (54, 55) for positively connecting at least one (44) of said two gears (43) (44) to said shaft (31), and for permitting angular adjustment, about said axis of rotation (32), of said first gear (44) with respect to the other gear (43) of the respective gear assembly.

9. A transmission as claimed in claim 8, wherein said connecting means (54, 55) comprise at least a splined coupling (54).

10. A transmission as claimed in claim 9, wherein said splined coupling (54) is a helical coupling; said connecting means (54, 55) further comprises axial adjusting means (55) interposed between said supporting shaft (31) and the respective said first gear (44).

11. A transmission as claimed in claim 10, wherein said axial adjusting means comprises an annular element (55) selectable from a number of annular adjusting elements.

12. A transmission as claimed in claim 6, wherein said two bearings (39)(40) connect respective end portions (36)(37) of said supporting shaft (31) to said structure (2); said two gears (43)(48) being located between said two bearings (39)(40).

13. A transmission as claimed in claim 6, wherein said supporting shaft (31) is a hollow shaft formed in one piece.

* * * * *